(12) United States Patent
Breton et al.

(10) Patent No.: US 7,591,515 B2
(45) Date of Patent: Sep. 22, 2009

(54) DEBRIS DEFLECTING DEVICE

(75) Inventors: Rémi Breton, Drummondville (CA); Louis James Verville, Whitehorse (CA)

(73) Assignee: Soucy International Inc., Drummondville (CA)

( * ) Notice: Subject to any disclaimer, the term of this patent is extended or adjusted under 35 U.S.C. 154(b) by 0 days.

(21) Appl. No.: 11/942,469

(22) Filed: Nov. 19, 2007

(65) Prior Publication Data

US 2008/0164754 A1    Jul. 10, 2008

Related U.S. Application Data

(63) Continuation-in-part of application No. 11/142,697, filed on Jun. 2, 2005, now abandoned.

(51) Int. Cl.
*B60S 1/68* (2006.01)
(52) U.S. Cl. ...................................... 305/107; 280/855
(58) Field of Classification Search .................. 305/100, 305/107, 110, 115, 194, 199; 280/855, 856; 301/36.3
See application file for complete search history.

(56) References Cited

U.S. PATENT DOCUMENTS

| | | | | |
|---|---|---|---|---|
| 2,637,603 | A | * | 5/1953 | Cartlidge ..................... 305/107 |
| 2,823,928 | A | * | 2/1958 | Dahlstrom ................... 280/856 |
| 3,913,943 | A | * | 10/1975 | Tamburino et al. .......... 280/856 |
| 4,830,439 | A | | 5/1989 | Collins et al. |
| 5,005,922 | A | | 4/1991 | Edwards et al. |
| 5,226,703 | A | | 7/1993 | Norman |
| 5,697,683 | A | | 12/1997 | Arulandu et al. |
| 5,725,292 | A | | 3/1998 | Keedy et al. |
| 6,019,443 | A | | 2/2000 | Freeman |
| 2002/0148065 | A1 | | 10/2002 | Trent |

FOREIGN PATENT DOCUMENTS

JP        04027645 A  *  1/1992

* cited by examiner

*Primary Examiner*—S. Joseph Morano
*Assistant Examiner*—Kip T Kotter
(74) *Attorney, Agent, or Firm*—Brouillette & Partners LLP; Robert Brouillette

(57) ABSTRACT

This invention relates to a device to deflect debris and to reduce the accumulation thereof in the guide lug receiving space defined between the inner and outer portions of a wheel of a tracked vehicle. The device generally comprises a resilient band structure having a loop or collar portion partially disposed around the wheel of the vehicle and inside the guide lug receiving space thereof, a connecting portion adapted to be mounted into a support element fixed to the tracked vehicle and located about the wheel, and a deflecting portion extending between the loop portion and the connecting portion. The loop portion at least partially embraces the wheel and generally remains in a slipping contact therewith in order to support the deflecting portion. The deflecting portion effectively deflects debris away from the guide lug receiving space of the wheel and also prevents excessive accumulation of debris therein. The connecting portion generally maintains the position of the loop and deflecting portions while allowing them to move according to the movements of the wheel.

24 Claims, 8 Drawing Sheets

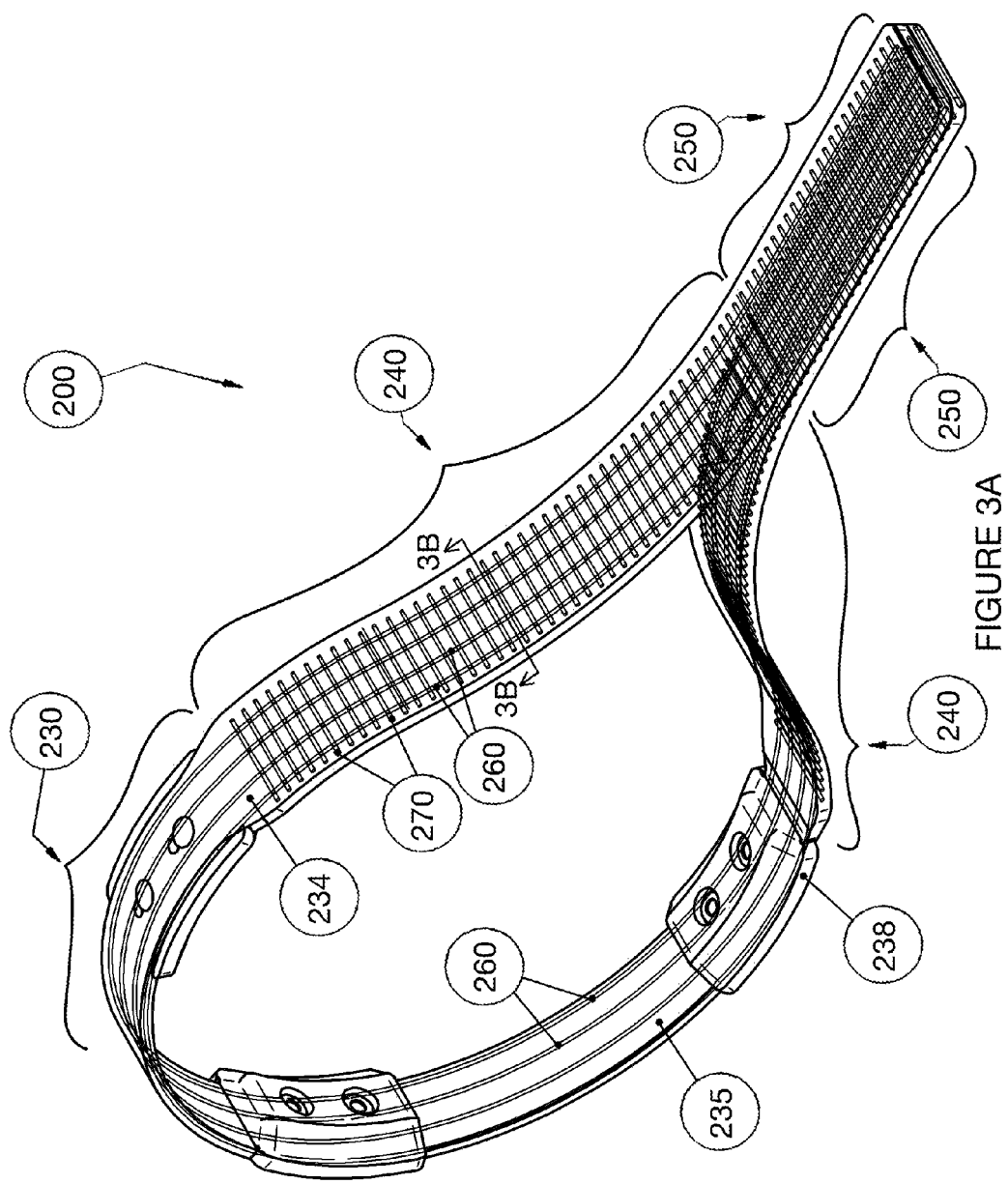

DEBRIS DEFLECTING DEVICE

CROSS-REFERENCE TO RELATED APPLICATIONS

The present patent application is a continuation-in-part of commonly assigned U.S. patent application Ser. No. 11/142,697 filed Jun. 2, 2005, now abandoned and claims the benefits of priority thereof. The disclosure of U.S. patent application Ser. No. 11/142,697 is incorporated herein by reference.

FIELD OF THE INVENTION

The present invention generally relates to tracked vehicles and more specifically to devices to deflect debris (e.g. snow, ice, mud, soil, gravel, rock and the like) and/or to reduce the accumulation thereof in the wheels of such tracked vehicles during driving operations.

BACKGROUND OF THE INVENTION

Conventionally, tracked vehicles comprise a set of wheels on each side of the vehicle that run in an endless track. During the operation, the track picks up materials such as snow, ice, mud, soil, rock, gravel and other similar debris (hereinafter "debris") from the ground and carries them into the wheels where they often become packed between the inner surface of the track and the wheel. In the case of elastomeric tracks, this can result in de-tracking of the track from the wheels.

There exist some devices to scrape debris from the wheels and/or tracks of tracked vehicles.

U.S. Pat. No. 2,637,603 issued to Cartlidge on May 5, 1953, disclosed a muck stripper to remove debris from the inner surface of the track. The stripper generally comprises a ring mounted around a wheel and fixedly attached to the frame of the vehicle via a rigid member. The ring further comprises a deflector positioned near the inner surface of the track for effectively deflecting debris away from the track as they approach the wheel. Though effective to remove debris from the inner surface of older models of tracks, the stripper is not particularly adapted to newer track designs. Indeed, since the stripper is rigidly mounted to the vehicle to prevent movement of the deflector, the stripper cannot follow the movements of the wheel. Additionally, the stripper is not bi-directional U.S. Pat. No. 5,226,703 issued to Norman on Jul. 13, 1993 disclosed an idler roller mounting/scraper for track vehicle which includes mounting bracket with two sets of teeth on opposite sides of the roller in order to scrape and remove mud and debris. While this device may be suitable for the particular purpose which it addresses, the design of this device is very complex.

U.S. Pat. No. 5,697,683 issued to Arulandu et al. on Dec. 16, 1997 disclosed a biased scraping apparatus for an idler which provides a scraper assembly that defines a plurality of scraping portions that are adapted to carry a scraping insert on an end portion thereof. While this device may be suitable for the particular purpose which it addresses, the design of this device is relatively intricate and significantly costly.

U.S. Pat. No. 5,725,292 issued to Keedy et al. on May 10, 1998 disclosed a scraping apparatus for a track idler which provides a scraper assembly that defines a plurality of scraping portions that continuously engage the contact surfaces of the idler to remove foreign material therefrom before the contact surfaces engage other track chain components. While this design may be operated with some success, this design is subject to severe wear.

U.S. Pat. No. 6,019,443 issued to Freeman on Feb. 1, 2000 disclosed a debris cutter for sprocket drive which has stationary cutter blades fixed to a chassis of the tractor to cut refuse entrained between the sprocket and the chassis. While this device may be suitable for the particular purpose to which it addresses, it is operative only during one-way rotation of the wheel.

Notwithstanding the foregoing prior art, it is more effective to deflect debris and/or to reduce the accumulation thereof in the wheels instead of having to scrape and remove the debris later. Thus, there is a need to develop a device to deflect debris and/or reduce the accumulation thereof in the wheels of tracked vehicles. Furthermore, there is a need for such an apparatus that applies very little pressure on the wheels in contrast to existing scraper solutions.

OBJECTS OF THE INVENTION

Accordingly, an object of the present invention is to provide a device to deflect debris and to reduce the accumulation thereof in the guide lug receiving space defined between the inner and the outer portions of the wheels (i.e. idler wheel and sprocket wheel) of tracked vehicles that obviates the above-mentioned disadvantages.

A further object of the present invention is to provide a device to deflect debris and to reduce the accumulation thereof in the guide lug receiving space defined between the inner and the outer portions of the wheels of tracked vehicles which is effective regardless of the direction of rotation of the wheel.

An additional object of the present invention is to provide a device to deflect debris and to reduce the accumulation thereof in the guide lug receiving space defined between the inner and the outer portions of the wheels of tracked vehicles which can be installed on the vehicle without removing the track and/or the wheel, which requires less maintenance, which is easy to manufacture and which is relatively inexpensive.

Yet another object of the present invention is to provide a device to deflect debris and to reduce the accumulation thereof in the guide lug receiving space defined between the inner and the outer portions of the wheels of tracked vehicles which will not damage the wheel and/or the track upon accidental failure or breakage.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The aforesaid and other objectives of the present invention are realized by generally providing a device to deflect debris and to reduce the accumulation thereof in the guide lug receiving space defined between the inner and the outer portions of the wheels of tracked vehicles and more particularly in the guide lug receiving space of idler wheel or sprocket wheel of such vehicles.

Wheels of tracked vehicle, especially heavier ones, are often made of two parts: an outer wheel portion and an inner wheel portion. These wheel portions are generally joined near the axle and are separated near their outer perimeter such that they define an open space or gorge therebetween wherein the guide lugs, located on the inner surface of the endless track, can be received.

In the prior art, the gorge defined by the inner and outer wheel portions tended to become filled with debris, thereby hindering the passage of the guide lugs, damaging the guide lugs and/or the track and ultimately provoking de-tracking of the track.

Accordingly, the device of the present invention generally deflects debris located in the gorge of the wheel and reduces their accumulation therein in order to create a channel free of debris for the guide lugs of the endless track.

In accordance with the present invention, the device is generally constituted of a band structure made from resilient material such as, but not limited to, spring steel or elastomeric material.

The device generally comprises a loop or collar portion disposed inside the gorge of the wheel and partially embracing the internal surface thereof, a connecting portion adapted to be mounted into a support element fixed to the frame of the vehicle, and a deflecting portion, extending between the loop portion and the connecting portion, for deflecting debris away from the inside of the gorge and for creating a channel free of debris for the guide lugs.

The loop portion of the device generally embraces at least a portion of the internal surface of the gorge and generally remains in partial contact therewith in order to provide sufficient support for the deflecting portion.

It is preferable that the inner surface of the loop portion has a shape generally matching the shape of the internal surface of the gorge. Preferably, the inner surface of the loop portion can be provided with one or more slippers which project inwardly toward the internal surface of the gorge to be in a contact or near contact with the same. Also, or alternatively, the inner surface of the loop portion can be provided with a layer of low friction material such as UHMW polyethylene. Understandably, the slippers could also be made from low friction material such as UHMW polyethylene. The present invention is not so limited.

The connecting portion of the device is generally mounted into a support element fixedly attached to the frame of the vehicle, preferably near the wheel around which the device is installed. Still, due to the resiliency of the band structure, the connecting portion generally allows the loop portion and the deflecting portion to move forward and backward and possibly upward and downward as the wheel itself moves.

The deflecting portion of the device extends between the loop portion and the connecting portion and generally extends both inside and outside the gorge. In accordance with the present invention, the deflecting portion of the device is preferably reinforced in order to prevent the deformation thereof when debris are forcefully pushed thereon. Understandably, the nature of the reinforcement of the deflecting portion can vary according to the material from which the device is made. Hence, in the case of a device made of spring steel, the deflecting portion could be made thicker than the rest of the device whereas in the case of a device made of elastomeric material, the deflecting portion could be longitudinally and laterally reinforced with, for example, longitudinally extending cables and laterally extending cables. The present invention is however not so limited.

In use, as debris start accumulating inside the gorge of the wheel, the deflecting portion, held in place and supported by the loop portion and the connecting portion, effectively deflects and scrapes debris located inside the gorge and thereby creates a channel free of debris therein for the guide lugs of the track.

The features of the present invention which are believed to be novel are set forth with particularity in the appended claims.

BRIEF DESCRIPTION OF THE DRAWINGS

For a better understanding of the nature and object of the invention, reference should be had to the following detailed description taken in connection with the accompanying drawings in which:

FIG. 3A is a transparent isometric side view of the second embodiment of the debris deflecting device shown in FIG. 3.

DETAILED DESCRIPTION OF THE PREFERRED EMBODIMENT

A novel debris deflecting device will be described hereinafter. Although the invention is described in terms of specific illustrative embodiments, it is to be understood that the embodiments described herein are by way of example only and that the scope of the invention is not intended to be limited thereby.

Figure 1:
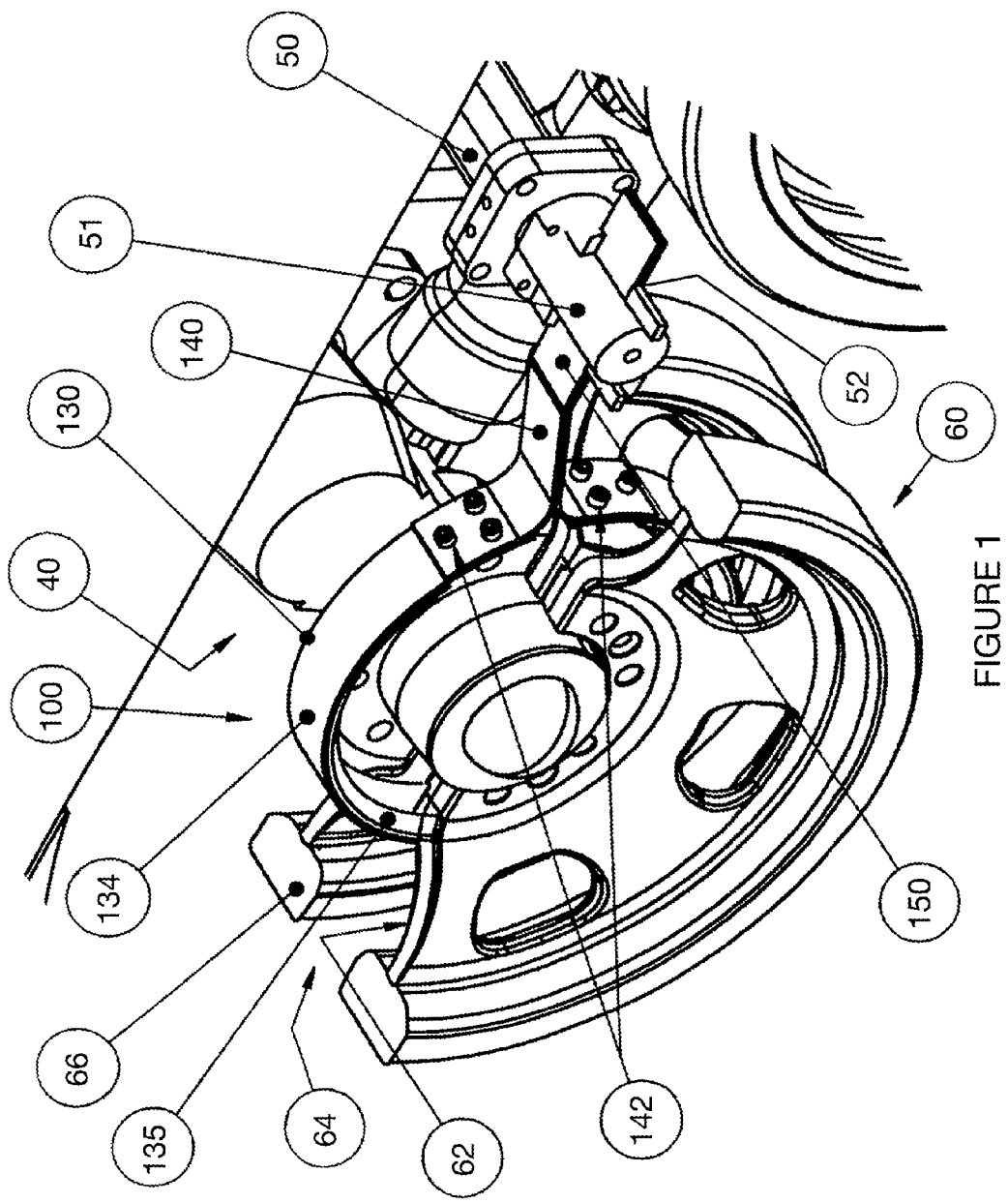
FIG. 1 is a fragmentary isometric side view of a first embodiment of the debris deflecting device, according to the present invention, in working position around an idler wheel.

FIG. 1 shows a first exemplary embodiment of a debris deflecting device 100 as installed on an idler wheel 60 of a tracked vehicle 40.

The device 100 includes a loop portion 130, a deflecting portion 140 and a connecting portion 150. A support element 50, fixedly mounted to the frame of the vehicle 40, is also provided to support the device 100. The support element 50 is generally provided with a holding portion 51, located near the idler wheel 60, having therethrough a slot 52 adapted to receive the connecting portion 150 of the device 100.

In the embodiment shown in FIG. 1, the loop portion 130, the deflecting portion 140 and the connecting portion 150 are all made of one or more flexible strips of resilient spring steel though other resilient metals or alloys could be used. The present invention is not so limited.

As shown in FIG. 1, the loop portion 130 is generally disposed in the gorge 64, defined between the outer wheel portion 62 and the inner wheel portion 66, and partially embraces the internal surface of the gorge 64. The loop portion 130 has an outer surface 134 and an inner surface 135. The inner surface 135 of the loop portion 130 is generally in at least partial contact with the internal surface of the gorge 64 in order to provide support to the deflecting portion 140 as the latter is pushed either downward or upward by the force exerted by the debris effectively deflected.

Figure 2:
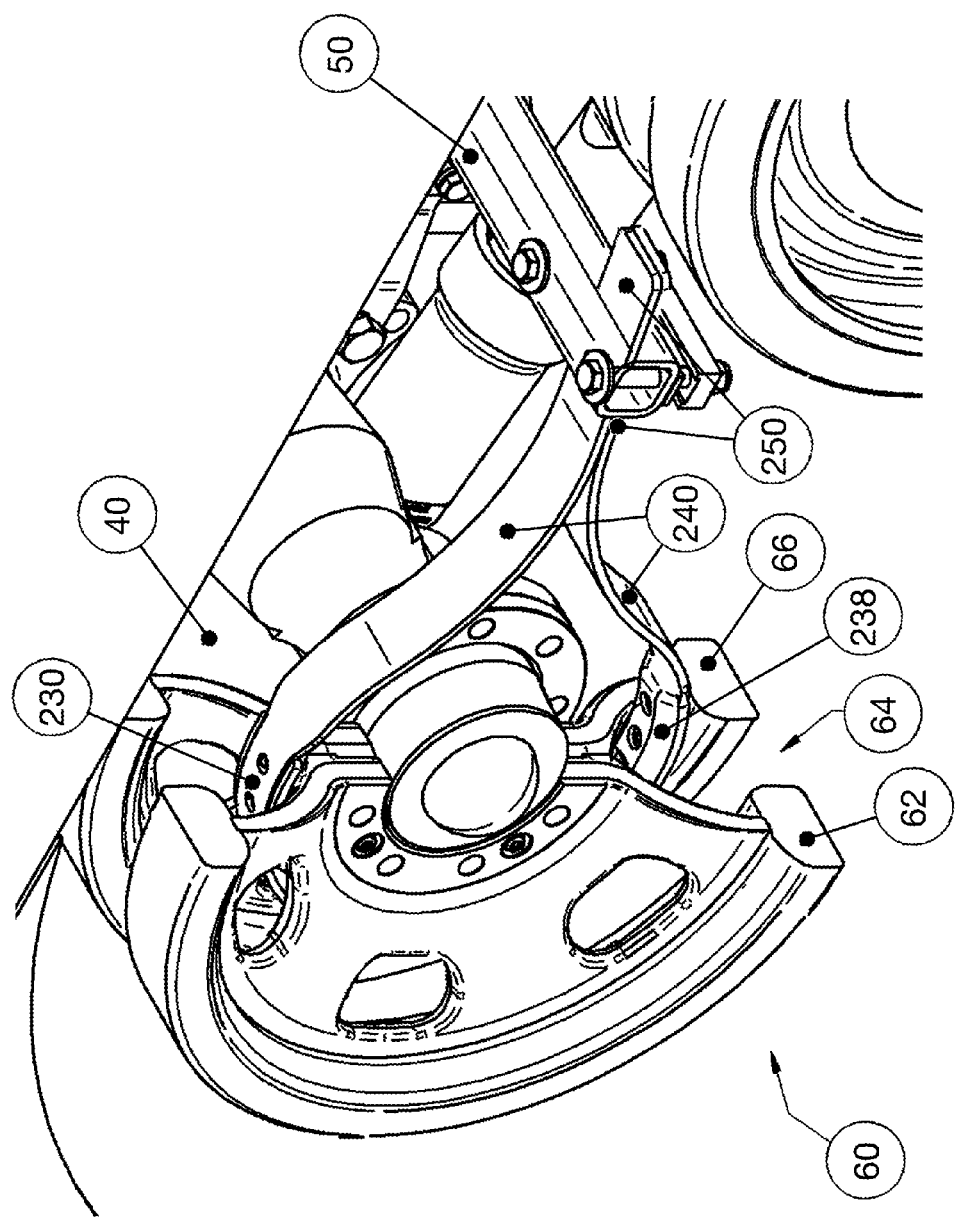
FIG. 2 is a fragmentary isometric side view of a second embodiment of the debris deflecting device, according to the present invention, in working position around an idler wheel.

Since the loop portion 130 is generally in at least partial contact with the internal surface of the gorge 64, it is preferable that the shape of the inner surface 135 of the loop portion 130 be generally complementary with the shape of the internal surface of the gorge 64. Furthermore, in order to reduce friction between the inner surface 135 and the internal surface of the gorge 64, the inner surface 135 is preferably provided with a layer of low friction material such as, but not limited to, UHMW polyethylene. Still, as shown in the embodiment of FIG. 2, the inner surface 135 could also, or alternatively, be provided with slippers (not shown in FIG. 1) projecting toward the internal surface of the gorge 64. Understandably, the shape of the slippers would also preferably match the shape of the internal surface of the gorge 64 and would preferably also be made of low friction material.

Still referring to FIG. 1, the connecting portion 150 of the device 10 is generally adapted to be slidingly mounted into the slot 52 of the holding portion 51 of the support element 50. Hence, due to the sliding engagement between the connecting portion 150 and the slot 52 and due to the resiliency of the spring steel, the connecting portion 150 generally allows forward, backward, upward and downward movements of the loop portion 130 and the deflecting portion 140 in order for them to follow the movements of the wheel 60 during operation of the vehicle 40.

The deflecting portion 140, which is located between the loop portion 130 and the connecting portion 150, generally extends both inside and outside the gorge 64. Additionally, the width of the deflecting portion 140 must generally match the width of the gorge 64 for the deflecting portion 140 to effectively deflect debris away from the inside of the gorge 64 in order to create a guide lug receiving channel 68 (see FIG. 6) relatively free of debris for the guide lugs 85 of the track 80 (see FIG. 5). Still, the exact shape of the deflecting portion 140 can vary according to the configuration of the wheel 60.

In accordance with the present invention, in order to prevent deformation of the deflecting portion 140 as it deflects debris, the latter is provided with reinforcements. In the embodiment of FIG. 1, the reinforcements are generally additional metal layers fixedly mounted to the deflecting portion 140 by means known in the art (e.g. rivets, solder, etc.). In FIG. 1, the additional layers are fixedly mounted with rivets 142. The present invention is however not so limited.

By being so reinforced, the deflecting portion 140 does not deform even as debris are forcefully pushed thereon. It is to be understood that a deformed deflecting portion 140 would essentially lose its usefulness since it would no longer create a channel 68 free of debris wide enough to allow the unhindered passage of the guide lugs 85 in the gorge 64 of the wheel 60.

FIG. 2 shows a second exemplary embodiment of a debris deflecting device 200 as installed on an idler wheel 60 of a tracked vehicle 40.

Similar to device 100, the device 200 includes a loop portion 230, a deflecting portion 240 and a connecting portion 250. A support element 50, fixedly mounted to the frame of the vehicle 40, is also provided to support the device 200. The support element 50 is generally provided with a holding portion 51, located near the idler wheel 60, having therethrough a slot 52 adapted to receive the connecting portion 250 of the device 100. However, contrary to the first embodiment, in the second embodiment, the connecting portion 250 is fixedly mounted in the slot 52.

Figure 4:
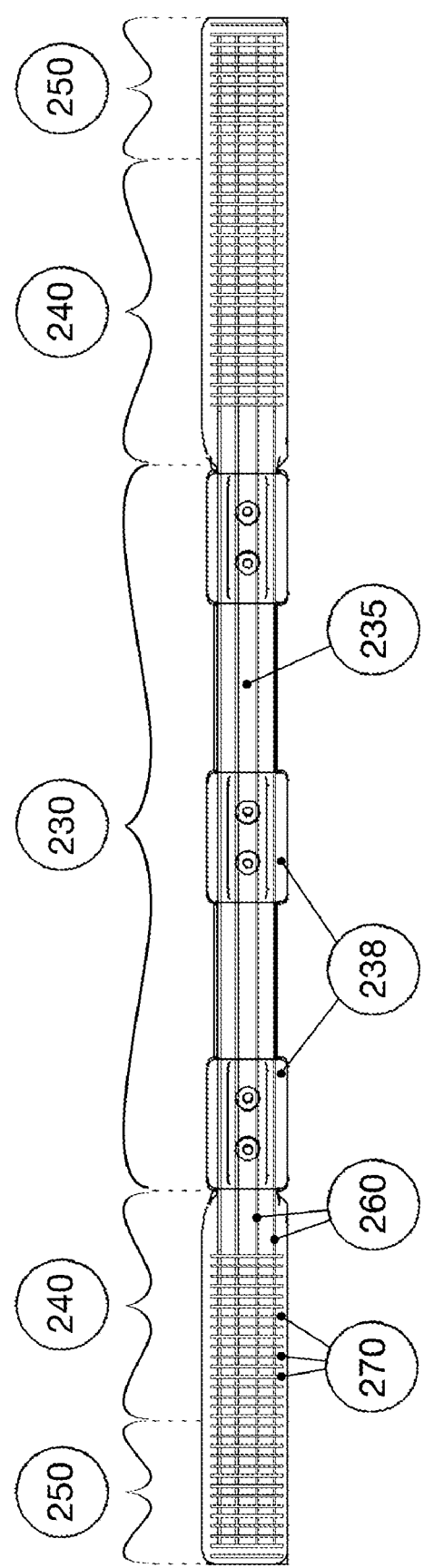
FIG. 4 is a transparent top view of the second embodiment of the debris deflecting device in its uninstalled form.

As best shown in FIG. 4, in this second embodiment, the loop portion 230, the deflecting portion 240 and the connecting portion 250 are unitary and are made of a single band of reinforced elastomeric material, such as reinforced rubber.

Figure 3:
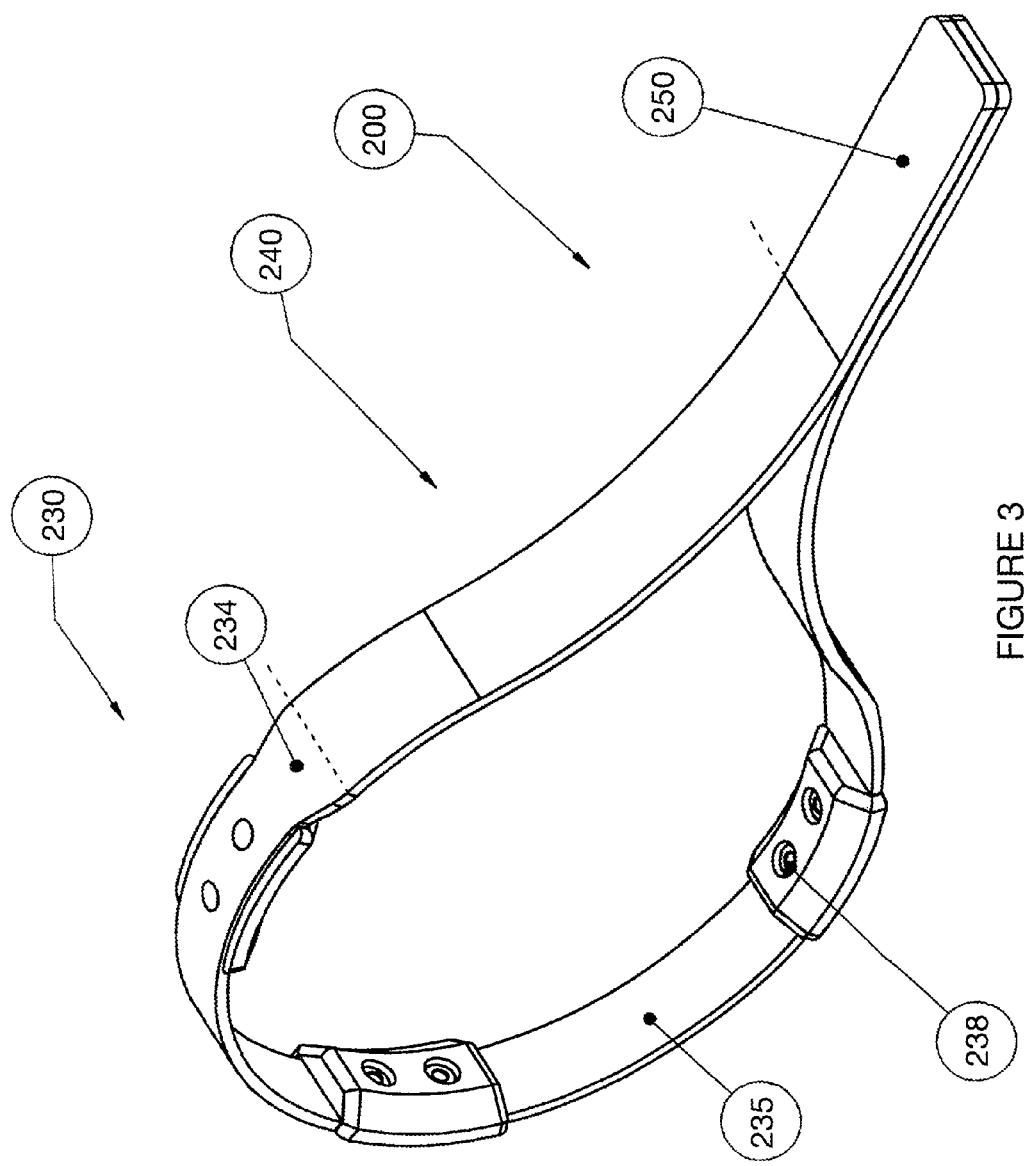
FIG. 3 is an isometric side view of a second embodiment of the debris deflecting device.

Referring now to FIG. 3, the loop portion 230, as the loop portion 130, has an outer surface 234 and an inner surface 235. The inner surface 235 of the loop portion 230 is provided with a plurality of slipper segments 238. The slipper segments 238 are preferably made from a low friction material such as, but not limited to, UHMW polyethylene. The slippers 238 generally serve to prevent premature wearing of the inner surface 235 of the loop portion 230 as the latter contact the internal surface of the gorge 64. As is well understood, the internal surface 235 and/or the slipper elements 238 may assume a variety of forms, lengths and cross-sectional profiles (not shown) as long as they are complementary with the configuration of the internal surface of the gorge 64.

Though not shown, the inner surface 235 of the loop portion 230 could also, or alternatively, be provided with a layer of low friction material such as UHMW polyethylene to limit the amount of friction between the inner surface 235 and the internal surface of the gorge 64 and to prevent premature wearing of the inner surface 235.

Figure 3B:
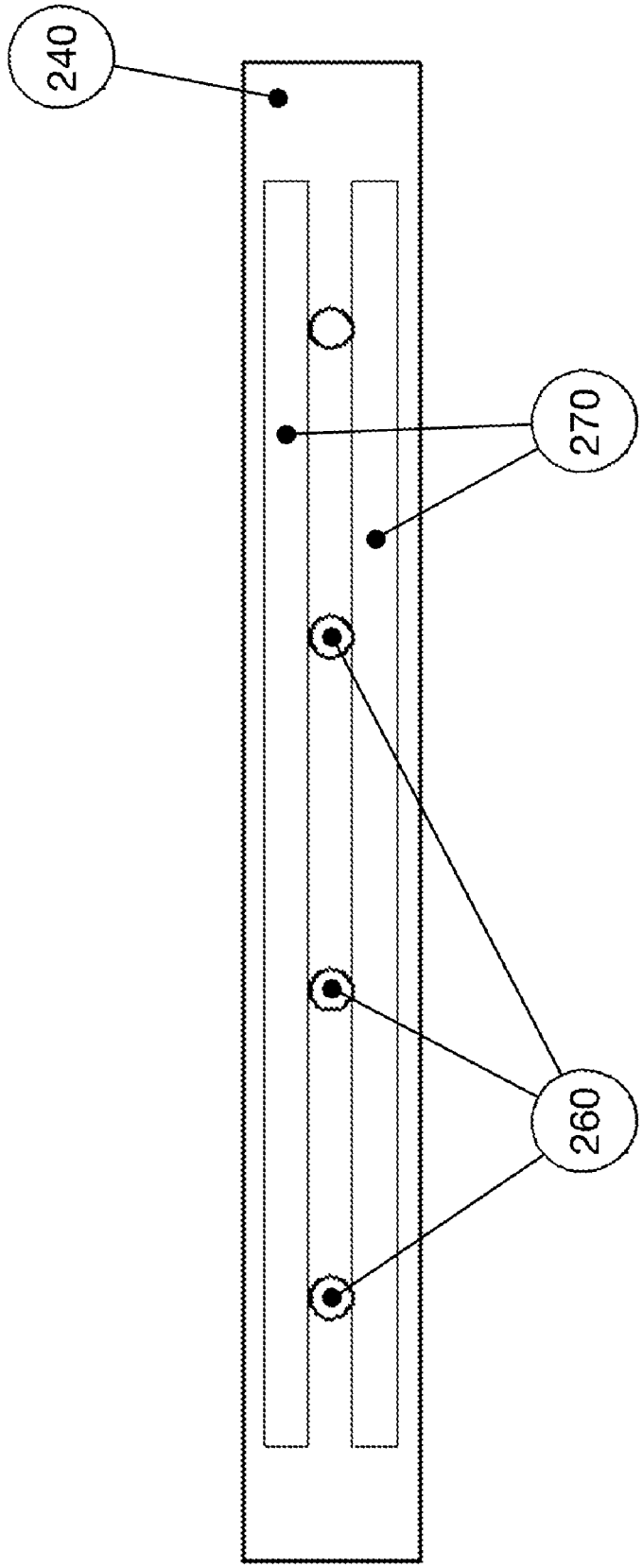
FIG. 3B is a cross-sectional view, taken along line 3B-3B of FIG. 3A.

Referring now to FIGS. 3A and 3B, since elastomeric materials are generally less rigid than metallic materials, it is preferable that the deflecting portion 240, and even the connecting portion 250, of the device 200 be reinforced with longitudinally extending cables or cords 260 and with laterally extending cables, cords, rods or bars 270. By providing the deflecting portion 240 with such longitudinal and lateral reinforcements, the latter is not deformed by the debris it deflects and therefore continuously creates a channel 68 free of debris inside the gorge 64 for the passage of the guide lugs 85. Understandably, as for the deflecting portion 140, the width of the deflecting portion 240 must generally match the width of gorge 64.

As the skilled addressee would understand, the functioning of the device 200 is essentially identical to the functioning the device 100.

Figure 5:
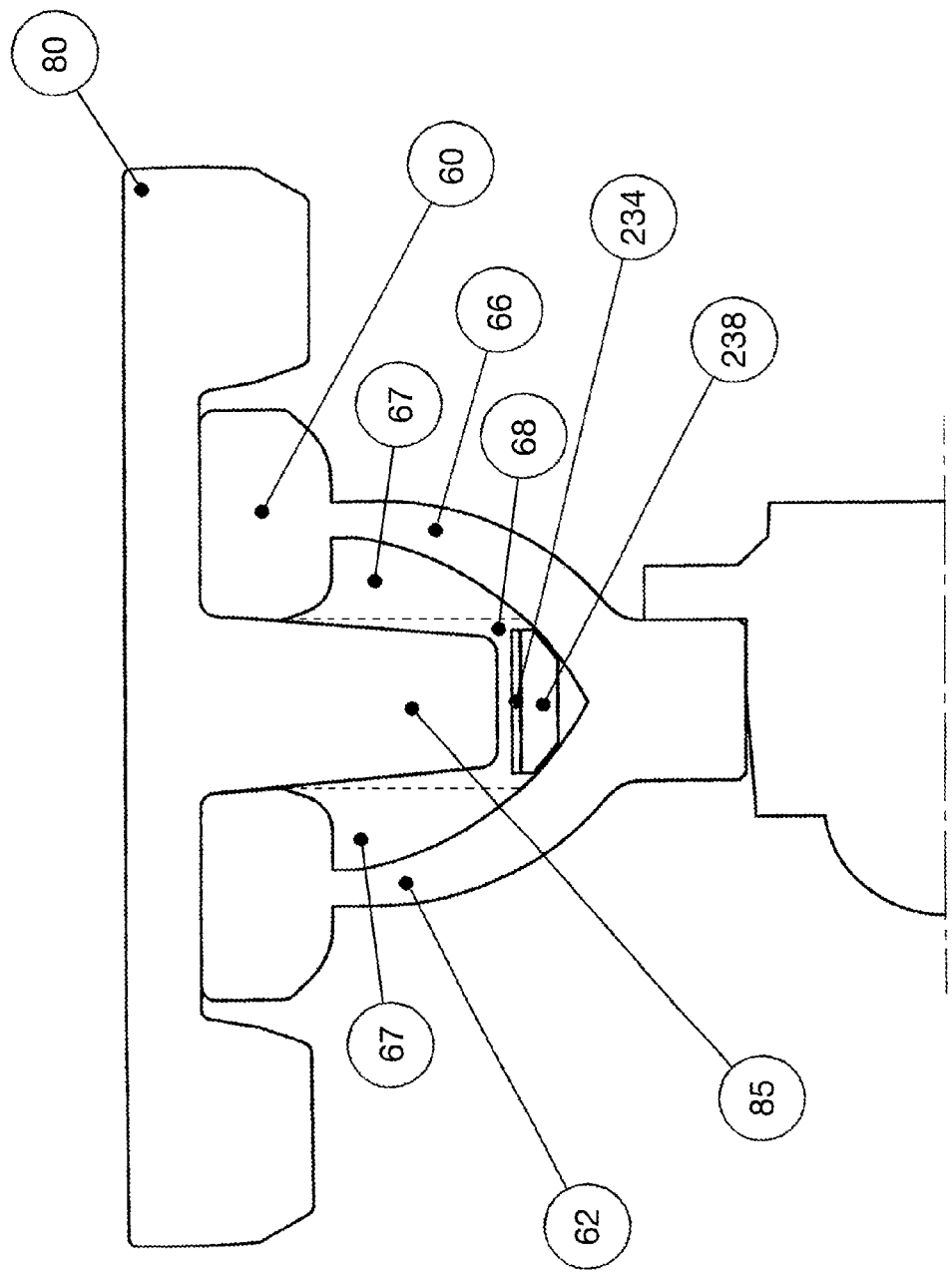
FIG. 5 is a cross-sectional view of the debris deflecting device of FIG. 2.
Figure 6:
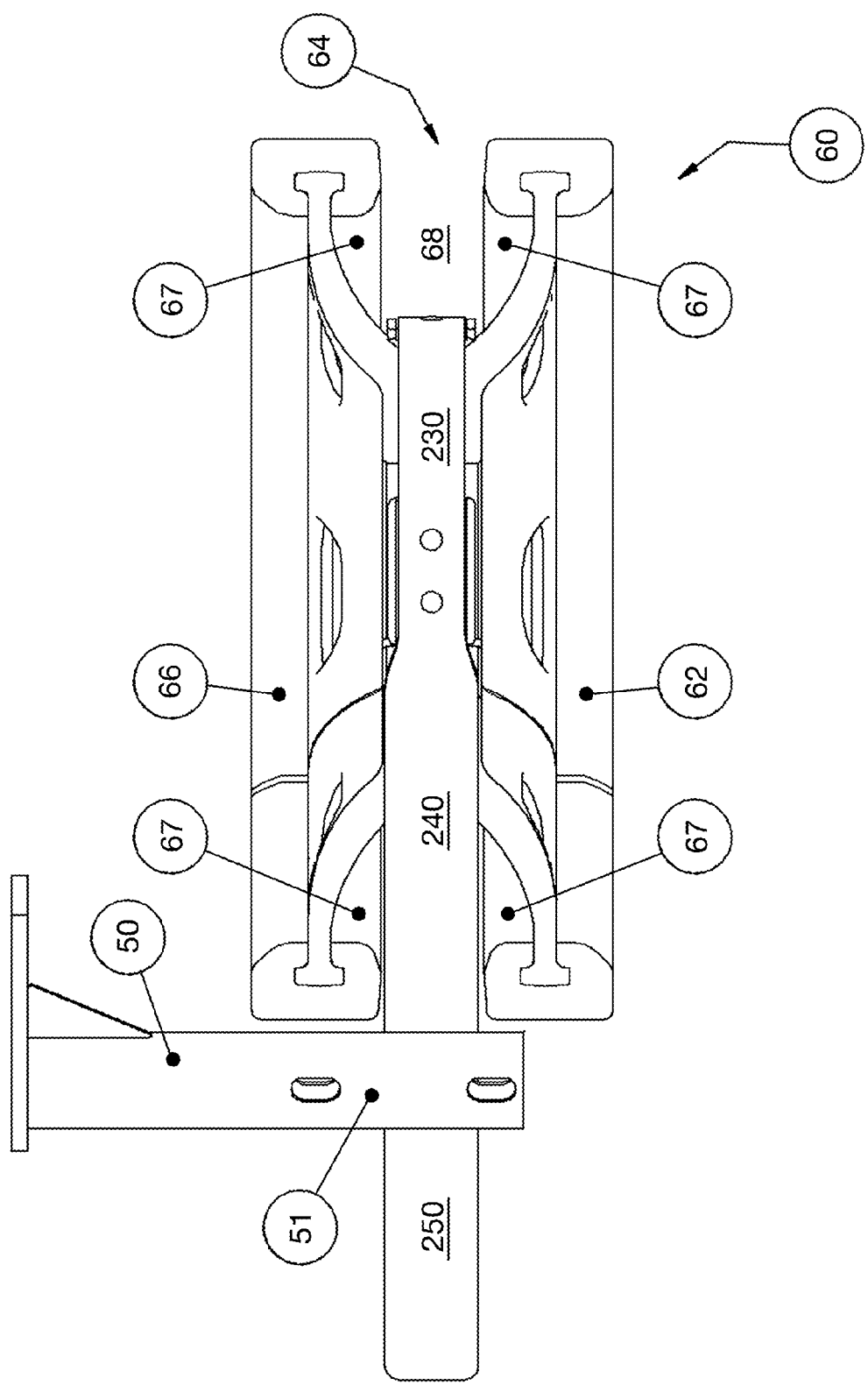
FIG. 6 is another cross-sectional view of the debris deflecting device of FIG. 2.

Hence, referring now to FIGS. 5 and 6, during normal operation of the vehicle 40, especially when effecting a turn, debris are introduced in the gorge 64 and more particularly in the guide lug receiving channel 68 and in the spaces 67 located on each side thereof (see FIG. 6). As the wheel 60 turns, in either clockwise or counter-clockwise direction, and as the track 80 moves, the debris located in the guide lug receiving channel 68 and the debris located in the spaces 67 which overflow in the guide lug channel 68 are effectively scraped and deflected away by the deflecting portion 240, thereby leaving a channel 68 substantially free of debris wherein the guide lugs 85 of the track 80 can pass unhindered.

Accordingly, during any driving conditions, when the tracked vehicle 40 is moving forward, backward or doing any manoeuvres whereby the wheel 60 rotates, the deflecting portion 240 effectively prevents any significant accumulation of debris in the guide lug receiving channel 68 of the gorge 64 of wheel 60. Furthermore, due to its relatively symmetrical shape, the device 200 (and the device 100) is essentially bi-directional in the sense that they work effectively in either a clockwise or a counter-clockwise direction of rotation of the wheel 60.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A bi-directional debris deflecting device for use with a wheel of a tracked vehicle, said wheel having an inner wheel element and an outer wheel element defining a gorge therebetween, said device comprising:
   a) a support element adapted to be fixedly mounted to said tracked vehicle;
   b) a unitary band structure defining:
      i) a loop portion adapted to be disposed around said wheel within said gorge;
      ii) a connecting portion adapted to be mounted to said support element; and iii) a deflecting portion extending between said loop portion and said connecting portion, said deflecting portion extending partially inside and partially outside said gorge and being reinforced with reinforcing elements;

wherein said portions comprise elastomeric material and said connecting portion is configured to allow said loop portion and said deflecting portion to move as said wheel moves.

2. A device as claimed in claim 1, wherein said wheel is an idler wheel or a sprocket wheel.

3. A device as claimed in claim 1, wherein said band structure is made of rubber.

4. A device as claimed in claim 1, wherein said reinforcing elements are longitudinally extending reinforcing elements.

5. A device as claimed in claim 4, wherein said longitudinally extending reinforcing elements are longitudinally extending reinforcing cables.

6. A device as claimed in claim 1, wherein said reinforcing elements are laterally extending reinforcing elements.

7. A device as claimed in claim 6, wherein said laterally extending reinforcing elements are laterally extending reinforcing rods.

8. A device as claimed in claim 1, wherein said loop portion and said connecting portion are also reinforced with reinforcing elements.

9. A device as claimed in claim 8, wherein said connecting portion and said deflecting portion are further reinforced with laterally extending reinforcing elements.

10. A device as claimed in claim 9, wherein said gorge has a width and said deflecting portion has a width and wherein said width of said deflecting portion is slightly narrower than said width of said gorge.

11. A device as claimed in claim 8, wherein said reinforcing elements are longitudinally extending reinforcing elements.

12. A device as claimed in claim 1, wherein said gorge has a width and said deflecting portion has a width and wherein said width of said deflecting portion is slightly narrower than said width of said gorge.

13. A device as claimed in claim 1, wherein said loop portion defines an outer surface, facing away from said wheel, and an inner surface, facing toward said wheel, and wherein said inner surface is provided with low friction material.

14. A device as claimed in claim 1, wherein said loop portion defines an outer surface, facing away from said wheel, and an inner surface, facing toward said wheel, and wherein said inner surface is provided with at least one slipper which is inwardly projecting toward said wheel.

15. A device as claimed in claim 1, wherein said loop portion defines an outer surface, facing away from said wheel, and an inner surface, facing toward said wheel, and wherein said inner surface has a shape substantially complementary to the shape of the internal surface of said wheel.

16. A bi-directional debris deflecting device for use with a wheel of a tracked vehicle, said wheel having an inner wheel element and an outer wheel element defining a gorge therebetween, said device comprising:
    a) a support element adapted to be fixedly mounted to said tracked vehicle;
    b) a unitary band structure made of resilient material and reinforced with reinforcing elements, said band structure defining:
        i) a loop portion adapted to be disposed around said wheel within said gorge;
        ii) a connecting portion adapted to be mounted to said support element; and
        iii) a deflecting portion extending between said loop portion and said connecting portion, said deflecting portion extending partially inside and partially outside said gorge;

wherein said portions comprise elastomeric material and said connecting portion is configured to allow said loop portion and said deflecting portion to move as said wheel moves.

17. A device as claimed in claim 16, wherein said reinforcing elements are longitudinally extending reinforcing elements.

18. A device as claimed in claim 17, wherein said longitudinally extending reinforcing elements are longitudinally extending cables.

19. A device as claimed in claim 16, wherein said deflecting portion is further reinforced with laterally extending reinforcing elements.

20. A device as claimed in claim 19, wherein said laterally extending reinforcing elements are laterally extending rods.

21. A device as claimed in claim 16, wherein said gorge has a width and said deflecting portion has a width and wherein said width of said deflecting portion is slightly narrower than said width of said gorge.

22. A tracked vehicle having at least one wheel comprising an inner wheel element and an outer wheel element defining a gorge region therebetween, said wheel being provided with a debris deflecting device comprising a support element fixedly mounted to said tracked vehicle near said wheel, and a unitary band structure reinforced with reinforcing elements, said band structure defining a loop portion disposed around said wheel within said gorge region, a connecting portion secured to said support element, and a deflecting portion extending between said loop portion and said connecting portion and extending partially inside and partially outside said gorge region; wherein said portions comprise elastomeric material.

23. A device as claimed in claim 22, wherein said reinforcing elements are longitudinally extending reinforcing elements.

24. A device as claimed in claim 22, wherein said deflecting portion is further reinforced with laterally extending reinforcing elements.

\* \* \* \* \*